(12) United States Patent
Van Handel (10) Patent No.: US 7,913,873 B2
(45) Date of Patent: Mar. 29, 2011

(54) LIQUID CONTAINER WITH UNINTERRUPTED COMFORT BAND AND METHOD OF FORMING SAME

(75) Inventor: Gerald J. Van Handel, Neenah, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 0 days.

(21) Appl. No.: 12/612,986

(22) Filed: Nov. 5, 2009

(65) Prior Publication Data
US 2010/0044424 A1    Feb. 25, 2010

Related U.S. Application Data

(60) Division of application No. 10/943,704, filed on Sep. 17, 2004, now Pat. No. 7,614,993, which is a continuation-in-part of application No. 10/797,949, filed on Mar. 10, 2004, now Pat. No. 7,464,856, which is a continuation of application No. 10/367,288, filed on Feb. 14, 2003, now Pat. No. 6,729,534, which is a continuation of application No. 10/199,211, filed on Jul. 19, 2002, now Pat. No. 6,536,657.

(60) Provisional application No. 60/306,757, filed on Jul. 20, 2001.

(51) Int. Cl.
*B65D 81/38* (2006.01)
*B65D 90/04* (2006.01)

(52) U.S. Cl. ............... 220/592.26; 220/62.12

(58) Field of Classification Search ............ 220/592.26, 220/592.2, 592.17, 592.16, 495.03, 495.04, 220/4.26, 62.22, 62.12, 675, 669, FOR. 173, 220/FOR. 172, FOR. 153, FOR. 115, FOR. 112, 220/62.18, 495.01, 62.11, 592.01, 660; 229/403, 400; 206/507, 505, 503; 493/110; *B65D 81/38; A47J 41/00*
See application file for complete search history.

(56) References Cited

U.S. PATENT DOCUMENTS
593,316 A    11/1897   Woodman
(Continued)

FOREIGN PATENT DOCUMENTS
JP         57-065158 A      4/1982
(Continued)

OTHER PUBLICATIONS

Williams, Mark B., et al. "Invetigation of Spatial Resolution and Efficiency Using Pinholes With Small Pinhole Angle", 2003 IEEE, 2003, pp. 1760-1764, vol. 3.

*Primary Examiner* — Anthony Stashick
*Assistant Examiner* — Robert J Hicks (57) ABSTRACT

The sidewall portion of a cup or other container for a heated beverage or other hot liquid comprises a relatively rigid outer wall and a relatively flexible inner liner. The wall and liner are attached together at respective upper and lower circumferential bands and at least an intermediate portion of the liner between the upper and lower circumferential bands is separable from the outer wall, to thereby form a sealed void between the outer wall and the inner liner which extends circumferentially along the entire comfort band and which defines a comfort band encircling at least a middle region of the cup. In one embodiment, a liner preform is placed on a tapered mandrel provided with selectively heated circumferential bands for sealing the upper and lower circumferential bands of the liner to an inner surface of the outer wall.

12 Claims, 8 Drawing Sheets

U.S. PATENT DOCUMENTS

| | | | |
|---|---|---|---|
| 1,157,008 A | 10/1915 | Lang | |
| 1,407,688 A | 2/1922 | Banton | |
| 1,756,243 A | 4/1930 | Benson | |
| 1,944,042 A | 1/1934 | Thompson | |
| 2,266,828 A * | 12/1941 | Sykes | 220/1.5 |
| 2,563,325 A | 8/1951 | Morse | |
| 2,678,764 A | 5/1954 | Carlson | |
| 2,853,222 A | 9/1958 | Gallagher | |
| 2,961,849 A | 11/1960 | Hitchcock | |
| 3,082,900 A | 3/1963 | Goodman | |
| 3,134,307 A | 5/1964 | Loeser | |
| 3,203,611 A | 8/1965 | Anderson et al. | |
| 3,237,834 A | 3/1966 | Davis et al. | |
| 3,246,745 A | 4/1966 | Stoker, Jr. | |
| 3,402,874 A | 9/1968 | Sternall | |
| 3,406,814 A | 10/1968 | Gulliver | |
| 3,627,166 A | 12/1971 | Walter | |
| 3,669,337 A | 6/1972 | Struble | |
| 3,737,093 A | 6/1973 | Amberg et al. | |
| 3,781,183 A | 12/1973 | Doll | |
| 3,854,583 A | 12/1974 | Amberg et al. | |
| 3,988,521 A | 10/1976 | Fumel et al. | |
| 3,995,740 A | 12/1976 | Amberg et al. | |
| 4,051,951 A | 10/1977 | Smith | |
| 4,087,003 A | 5/1978 | Adamek | |
| 4,197,948 A * | 4/1980 | Amberg et al. | 206/520 |
| 4,261,501 A * | 4/1981 | Watkins et al. | 229/404 |
| 4,332,635 A * | 6/1982 | Holbrook et al. | 156/256 |
| 4,359,160 A * | 11/1982 | Myers et al. | 206/519 |
| 4,383,422 A | 5/1983 | Gordon et al. | |
| 4,398,904 A | 8/1983 | Fagerberg | |
| 4,435,344 A | 3/1984 | Iioka | |
| 4,452,596 A | 6/1984 | Clauss et al. | |
| 4,459,793 A * | 7/1984 | Zenger | 53/434 |
| 4,486,366 A | 12/1984 | Reddy | |
| 4,514,354 A | 4/1985 | Schlesinger et al. | |
| 4,551,366 A * | 11/1985 | Maruhashi et al. | 229/123.1 |
| 4,679,724 A | 7/1987 | Inagaki | |
| 4,692,132 A | 9/1987 | Ikushima et al. | |
| 4,923,557 A | 5/1990 | Dickey | |
| 4,971,845 A | 11/1990 | Aaker et al. | |
| 4,982,872 A | 1/1991 | Avery | |
| 4,985,300 A | 1/1991 | Huang | |
| 5,001,016 A | 3/1991 | Kondo et al. | |
| 5,063,005 A | 11/1991 | Doheny, Jr. | |
| 5,092,485 A | 3/1992 | Lee | |
| 5,145,107 A | 9/1992 | Silver et al. | |
| 5,205,473 A | 4/1993 | Coffin, Sr. | |
| 5,217,307 A | 6/1993 | McClintock | |
| 5,279,872 A | 1/1994 | Ralph | |
| 5,460,323 A * | 10/1995 | Titus | 229/403 |
| 5,469,983 A | 11/1995 | Yawata | |
| 5,490,631 A | 2/1996 | Iioka et al. | |
| 5,700,689 A | 12/1997 | Wuster | |
| 5,707,751 A | 1/1998 | Garza et al. | |
| 5,725,916 A | 3/1998 | Ishii et al. | |
| 5,736,231 A | 4/1998 | Todt | |
| 5,766,709 A | 6/1998 | Geddes et al. | |
| 5,840,139 A | 11/1998 | Geddes et al. | |
| 5,882,612 A | 3/1999 | Riley | |
| 5,952,068 A | 9/1999 | Neale et al. | |
| 5,954,217 A | 9/1999 | Brkovic et al. | |
| 5,993,705 A | 11/1999 | Grischenko et al. | |
| 6,030,476 A | 2/2000 | Geddes et al. | |
| 6,085,970 A | 7/2000 | Sadlier | |
| 6,098,829 A | 8/2000 | McHenry et al. | |
| 6,129,653 A | 10/2000 | Fredericks et al. | |
| 6,139,665 A | 10/2000 | Schmelzer et al. | |
| 6,142,331 A | 11/2000 | Breining et al. | |
| 6,152,363 A | 11/2000 | Rule, Jr. | |
| 6,224,954 B1 | 5/2001 | Mitchell et al. | |
| 6,364,149 B1 | 4/2002 | Smith | |
| 6,536,657 B2 * | 3/2003 | Van Handel | 229/403 |
| 6,729,534 B2 | 5/2004 | Van Handel | |
| 6,739,470 B2 | 5/2004 | Yawata | |
| 6,852,381 B2 | 2/2005 | Debraal et al. | |
| 6,872,462 B2 | 3/2005 | Roberts et al. | |
| 6,908,687 B2 | 6/2005 | Mendes et al. | |
| 7,281,650 B1 | 10/2007 | Milan | |
| 7,464,856 B2 | 12/2008 | Van Handel | |
| 7,464,857 B2 | 12/2008 | Van Handel | |
| 7,510,098 B2 | 3/2009 | Hartjes et al. | |
| 7,513,386 B2 | 4/2009 | Hartjes et al. | |
| 7,600,669 B2 | 10/2009 | Van Handel | |
| 2003/0015582 A1 * | 1/2003 | Handel | 229/403 |
| 2003/0021921 A1 * | 1/2003 | Debraal et al. | 428/34.2 |
| 2003/0121963 A1 * | 7/2003 | Van Handel | 229/403 |
| 2004/0170814 A1 | 9/2004 | Van Handel | |
| 2005/0029337 A1 | 2/2005 | Van Handel | |
| 2005/0184074 A1 | 8/2005 | Simmons et al. | |
| 2007/0000931 A1 | 1/2007 | Hartjes et al. | |
| 2007/0029332 A1 | 2/2007 | Hartjes et al. | |
| 2007/0114271 A1 | 5/2007 | Van Handel | |
| 2007/0240811 A1 | 10/2007 | Baggot et al. | |
| 2008/0093434 A1 | 4/2008 | Van Handel | |
| 2010/0224529 A1 | 9/2010 | Forloni | |
| 2010/0224637 A1 | 9/2010 | Ikeda et al. | |

FOREIGN PATENT DOCUMENTS

| | | |
|---|---|---|
| JP | 06-219474 A | 8/1994 |
| JP | 2000-177785 A | 6/2000 |
| WO | 2007/005793 A1 | 1/2007 |

* cited by examiner

LIQUID CONTAINER WITH UNINTERRUPTED COMFORT BAND AND METHOD OF FORMING SAME

CROSS REFERENCE TO RELATED APPLICATIONS

This application is a Division of application Ser. No. 10/943,704, which in turn is a continuation in part of application Ser. No. 10/797,949, (now U.S. Pat. No. 7,464,856) which in turn is a Continuation of application Ser. No. 10/367,288 (now U.S. Pat. No. 6,729,534), which in turn is a Continuation of application Ser. No. 10/199,211 (now U.S. Pat. No. 6,536,657), all claiming priority from Provisional Application 60/306,757 filed on Jul. 20, 2001.

BACKGROUND

This application generally relates to containers for liquids and more specifically, to a container having a sidewall that provides an uninterrupted comfort band defined by a sealed void between the liquid and an outer surface of the container, and to a method for forming such a sidewall.

The above-cited U.S. Pat. No. 6,536,657 (Van Handel) discloses a disposable thermally insulated container having a sidewall portion comprising a substrate layer and a film layer which cooperate to define an insulating layer therebetween, thereby maintaining the adjacent substrate material at a relatively moderate temperature even if the substrate and the film are not particularly resistant to heat transfer and the container is filled with a very hot liquid. In at least some of the described embodiments, the sidewall is formed from a sandwich-like blank generally in the shape of an annular sector, with two straight edges that are sealed together to thereby form an overlapping vertical side seam of alternating substrate and film layers without any insulation in the vicinity of the side seam, thus potentially permitting that side seam to become uncomfortably hot when the container is filled with a hot liquid.

Now expired U.S. Pat. No. 4,332,635 (Holbrook et al.) discloses a method and apparatus for forming a label in the shape of an annular sector and applying it to the exterior sidewall of a previously formed cup in the shape of a tapered frustum.

Now expired U.S. Pat. No. 4,197,948 (Amberg et al.) discloses a method and apparatus for forming a tapered sidewall for a stackable cup by placing a previously formed cylindrical tube of a heat shrinkable material over a heated mandrel.

The mentioned patents are hereby incorporated by reference in their entirety.

SUMMARY

The sidewall portion of a cup or other container for a heated beverage or other hot liquid comprises a relatively rigid outer wall and a relatively flexible inner liner. The wall and liner are attached together at respective upper and lower circumferential bands, and at least an intermediate portion of the liner between the upper and lower circumferential bands is separable from the outer wall, to thereby form a sealed void between the outer wall and the inner liner which extends circumferentially along the entire comfort band and which defines a comfort band encircling at least a middle region of the cup.

In one embodiment, a PE coated first blank generally in the shape of an annular sector has its two straight edges sealed together along a vertical side seam, to form a relatively rigid tapered outer sidewall having a generally frusto-conical shape with an upper circumference greater than a lower circumference. A similarly shaped second blank of a shrink film material is formed into a similarly tapered inner liner that is dimensioned so as to cover an interior surface of the sidewall corresponding to a predetermined "comfort band" encircling at least a middle region of the sidewall. Alternatively, the outer sidewall may be formed without any side seams and/or may include an integrally formed bottom portion. The outer sidewall and liner are then sealed together only at respective upper and lower edges of the comfort band, preferably using a tapered mandrel equipped with two selectively heated circumferential bands. Since at least the respective central portions (including the central portion of any included side seam) of the outer sidewall and of the inner liner are not attached to each other, the central portion of the liner between the upper and lower edges will tend to shrink into the interior in response to the application of heat, thereby defining an insulating void between the two bodies which extends about the full circumference of the comfort band and which reduces the thermal conductivity of the sidewall in the vicinity of the comfort band.

In an alternative embodiment, a sleeve-like liner preform is formed from two layers of shrink film material with a respective side seam connecting the two layers at each of two edges.

In another embodiment, the liner is formed by placing a seamless preform over a tapered mandrel.

Optionally, a bond inhibitor may be used to prevent the inner liner from being sealed to the outer sidewall except at the upper and lower circumferences of the liner, thereby facilitating a side seam to be formed using the same heated mandrel as is used to seal the liner to the outer sidewall.

Preferably, the container is a stackable disposable cup with a liner formed of a heat shrinkable material which is activated (i.e., has its tension released) only when the cup is being filled with a hot liquid. The sealing of the liner to the outer sidewall is performed in a way that any heat produced during the sealing operation is confined to the upper and lower circumferences of the liner, thereby not releasing the tension in the intermediate portion of the liner material such that the liner remains in close contact with the outer sidewall prior to use by the consumer and two or more unused cups may be conveniently stacked inside one another without the liner of a lower cup pressing against the outer sidewall of an upper cup.

The invention is defined in the appended claims, some of which may be directed to some or all of the broader aspects of the invention set forth above, while other claims may be directed to specific novel and advantageous features and combinations of features that will be apparent from the Detailed Description that follows.

DRAWINGS

Certain characteristics, features and advantages of various preferred embodiments are depicted in the accompanying drawings, in which.

DETAILED DESCRIPTION

Figure 1:
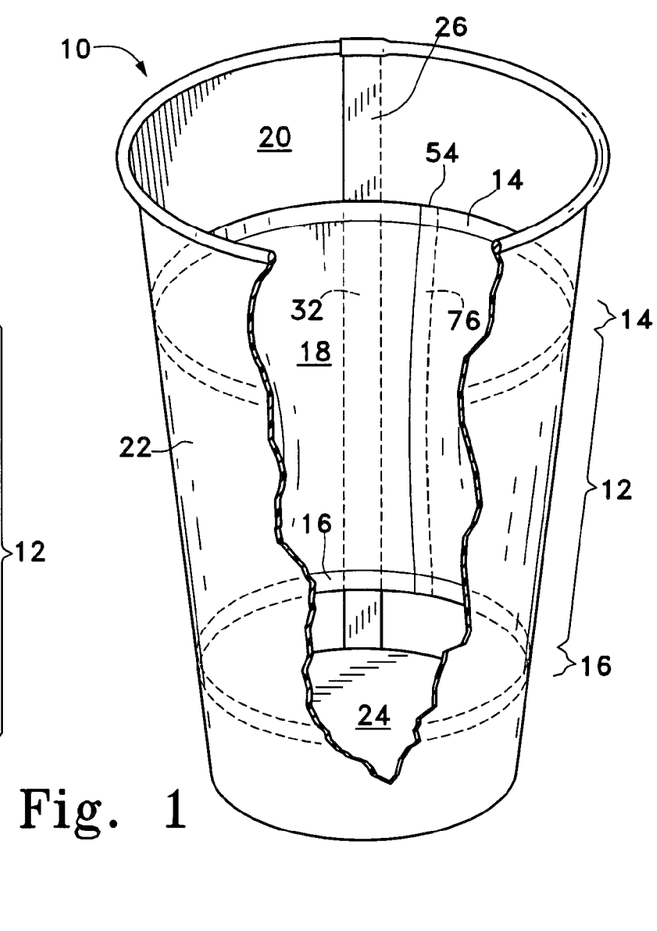
FIG. 1 is a partially cut away front perspective view of one embodiment of a disposable insulated cup having a defined comfort band.

Reference should now be made to FIG. 1, which is a partially cut away front perspective view of one embodiment of a disposable insulated cup 10 having a comfort band 12 defined between upper edge 14 and lower edge 16 of an inner liner 18. Upper edge 14 and lower edge 16 are sealed to the inner surface 20 of an otherwise conventional disposable cup having a relatively rigid sidewall 22 and bottom 24 formed from a polyethylene ("PE") coated paperboard stock, with a partially exposed vertical side seam 26 connecting the two straight edges of the generally annular sector shaped blank from which the outer sidewall 22 was formed. Cup 10 is preferably tapered to facilitate stacking, with sidewall 22 extending below bottom 24 by a sufficient distance to maintain a bottom space 28 (see FIG. 2) between the bottom 24 and the table or other support surface (not shown) on which the cup 10 may be standing.

Figure 2:
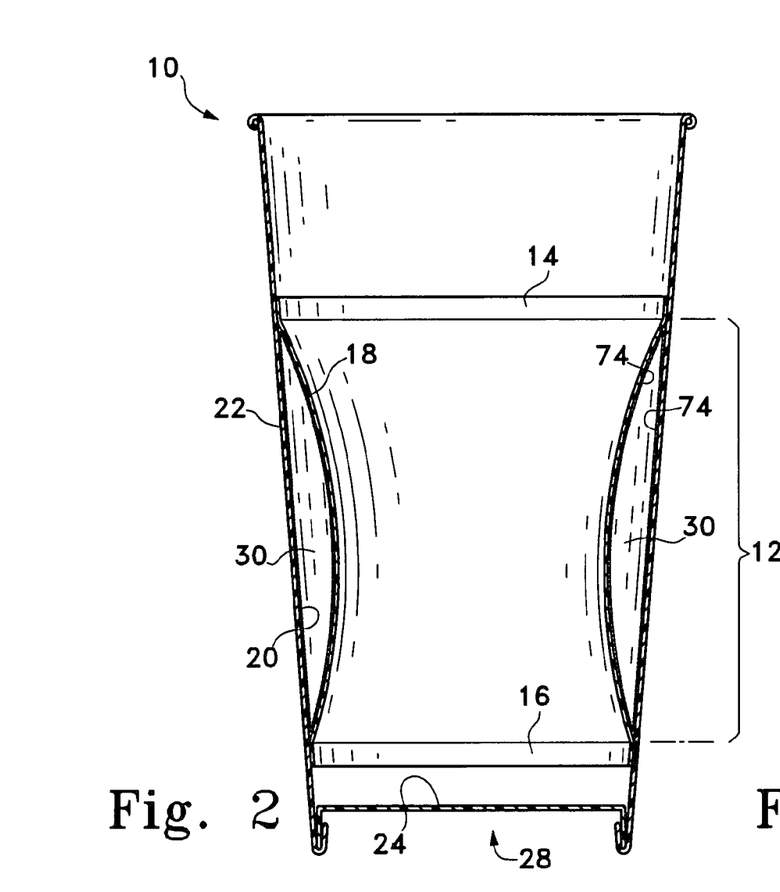
FIG. 2 is a vertical cross section of the cup of FIG. 1.

In accordance with one salient feature of the present invention, as shown more clearly in FIG. 2, at least a portion of inner liner 18 is separable from inner surface 20 of sidewall 22 to thereby define an expandable void 30 which preferably encircles the entire circumference of cup 10 and which expands in response to the application of heat to provide thermal insulation between comfort band 12 and any heated liquid in contact with inner liner 18. In particular, the comfort band 12 is defined by a central portion of inner liner 18 and a corresponding intermediate portion of outer sidewall 22 disposed between upper and lower circumferential sealing bands 14, 16 at respective upper and lower edge portions of inner liner 18. Moreover, that insulating void 30 extends over at least an intermediate seam portion 32 of outer sidewall vertical side seam 26. In the depicted embodiment, the cup 10 has a height of about 5 inches, a major (upper) diameter of about 3.50 inches, a minor (bottom) diameter of about 2.375 inches; the comfort zone 12 is about 3 inches high and is displaced from the top rim of the cup by approximately 1.50 inches. The upper and lower sealing bands 14, 16 each have a width of about 0.125 inches. In an embodiment using a liner 18 formed from a heat shrinkable material such as Bemis Clysar 75 LE, the extent to which the central region of liner 18 shrinks away from sidewall 22 and into the interior of cup 10 depends on the maximum temperature of the liquid, and may range from about 0.125 inches for warm (150 degree F.) to about 0.50 inches for almost boiling (212 degree F.) liquids. In alternate embodiments (not shown) the comfort zone may be wider or narrower, or at different heights, or even may extend over the entire interior volume of the cup.

Figure 3:
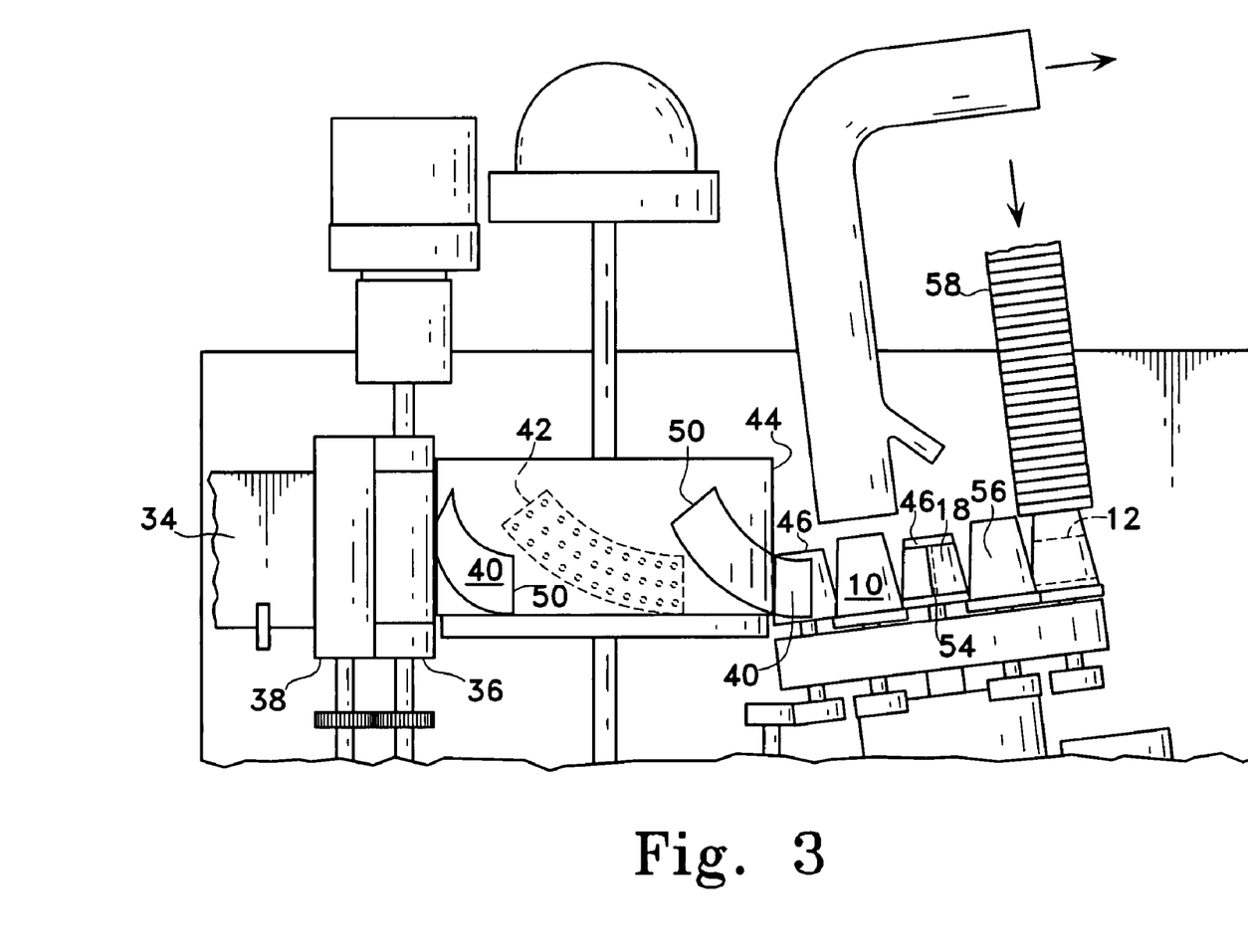
FIG. 3 shows one embodiment of a machine for forming a tapered inner liner from a single layer of heat shrinkable material and securing it to the interior of a previously formed outer body.

FIG. 3 shows a portion of a production line for tapered or frustum shaped cups similar to that proposed in the referenced U.S. Pat. No. 4,332,635. As shown, a continuous web 34 of heat shrinkable film is fed to a pair of rotary cutters 36, 38 and the resultant lining blanks 40 each generally in the shape of an annular sector are separated from the web 34 onto correspondingly shaped areas 42 on the outer periphery of a vacuum drum 44. Each blank 40 is in turn offloaded from drum 44 onto a frusto-conical shaped vacuum mandrel 46 (shown in more detail in FIG. 3A) which is rotating in synchronization therewith, by suitable manipulation of the respective vacuum applied to areas 42 of vacuum drum 44 and to holes 48 of mandrel 46. The two straight edges 50 of blank 40 are then heat sealed together by means of a heated vertical band 52 on mandrel 46, thereby forming a frusto-conical shaped liner 18 with a corresponding vertical seam 54 (see also FIG. 1). Next, a previously formed and otherwise conventional uninsulated cup 56 is dropped in an inverted orientation onto similarly oriented mandrel 46 from an stack 58 of such cups by means of a second set of vacuum holes 60 at the upper surface 62 of inverted mandrel 46, and a second set of heated bands 64, 66 (at upper edge 68 and lower edge 70 respectively of inverted mandrel 46) seal the previously formed liner 18 at respective lower 16 and upper 14 circumferential sealing bands (see FIG. 1) to corresponding circumferential bands on the PE coated interior 20 of uninsulated cup 56 (see FIG. 1). Heated bands 52, 64, 66 are preferably thermally isolated from the other surface portions of mandrel 46 and may be heated in conventional fashion by nichrome ribbon energized by an impulse power supply. In an alternative embodiment (not shown), the upper sealing band 14 and lower sealing band 16 of liner 18 can be sealed to the inner surface 20 of uninsulated cup 56 by means of a suitably heated external clamp or cuff which transfers heat through outer sidewall 22 to inner liner 18.

In accordance with another salient feature of the present invention, the intermediate portion 76 (see FIG. 2) of inner liner 18 disposed between upper and lower heated bands 64, 66 is preferably not secured to the inner surface 20 of cup 10; in particular, suitable precautions should be taken to ensure that at least inner surface 20 is not inadvertently sealed to those portions of the side seam 54 of liner 18 formed by heated vertical band 52 that are not in close proximity to upper and lower heat seal bands 64, 66. For example, the unfinished cup 56 may not be loaded onto mandrel 46 over liner 18 until the heat sealed liner seam 54 between edges 50 has cooled, or else a suitable release agent 74 (such as silicone grease) may be applied (as shown in FIG. 2) to at least the intermediate portion 76 of the heat sealed seam 54 before the uninsulated cup 56 is loaded. Alternatively, it may be possible to construct the portion of inner surface 20 within comfort band 12 (where any such adhesion is undesired) such that it will not adhere to inner liner 18 during fabrication and subsequent use. Similarly, if the sidewall 22 is formed on the same mandrel 46 as is used to form the inner liner 18, precautions should be taken to ensure that intermediate portion 32 of sidewall seam 26 is not inadvertently sealed to liner 18.

Figure 4:
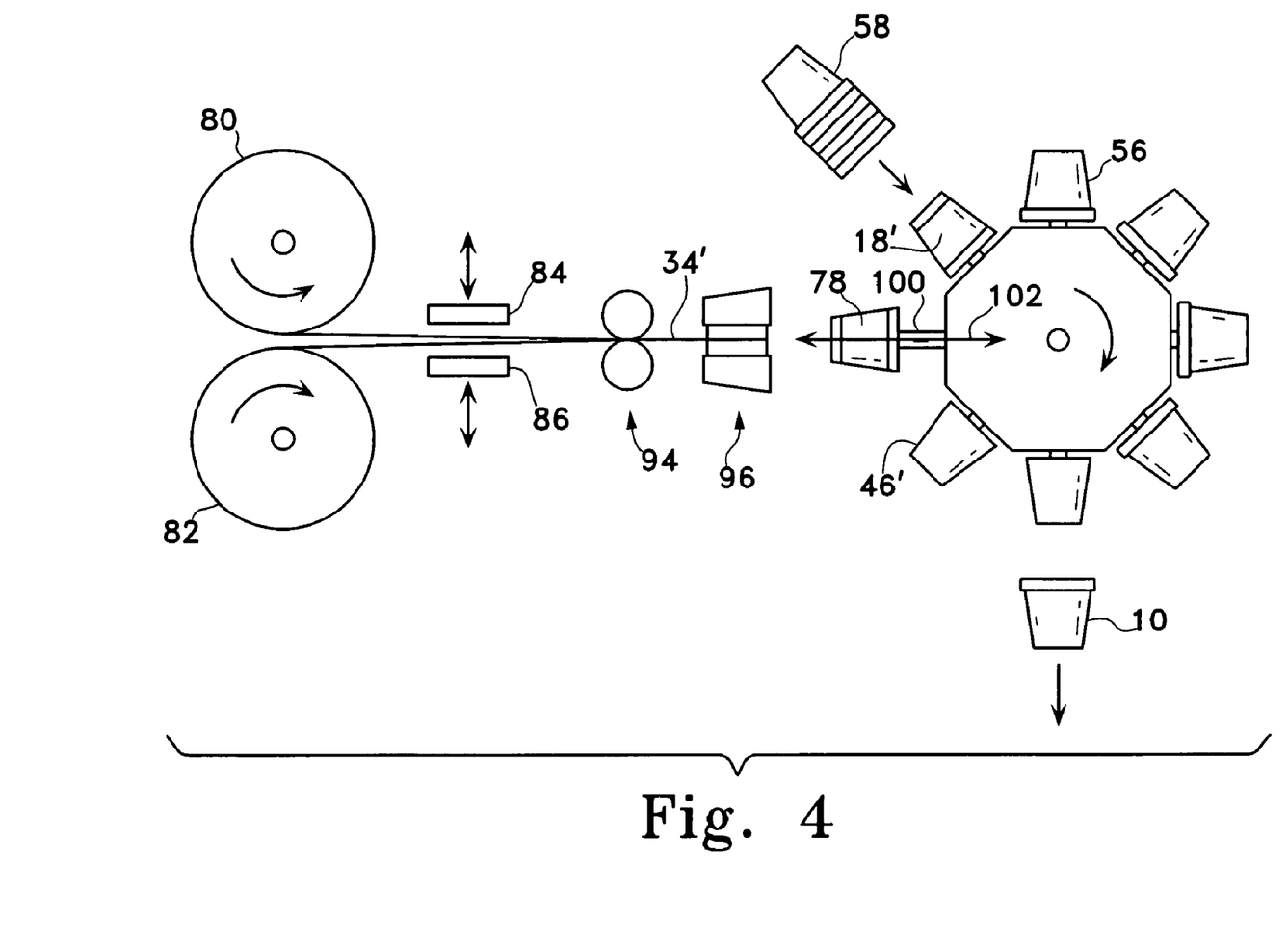
FIG. 4 shows an alternative embodiment of a machine for forming the tapered inner body from a sleeve-like preform consisting of two layers of heat shrinkable material and for securing it to the interior of the outer body.
Figure 4A:
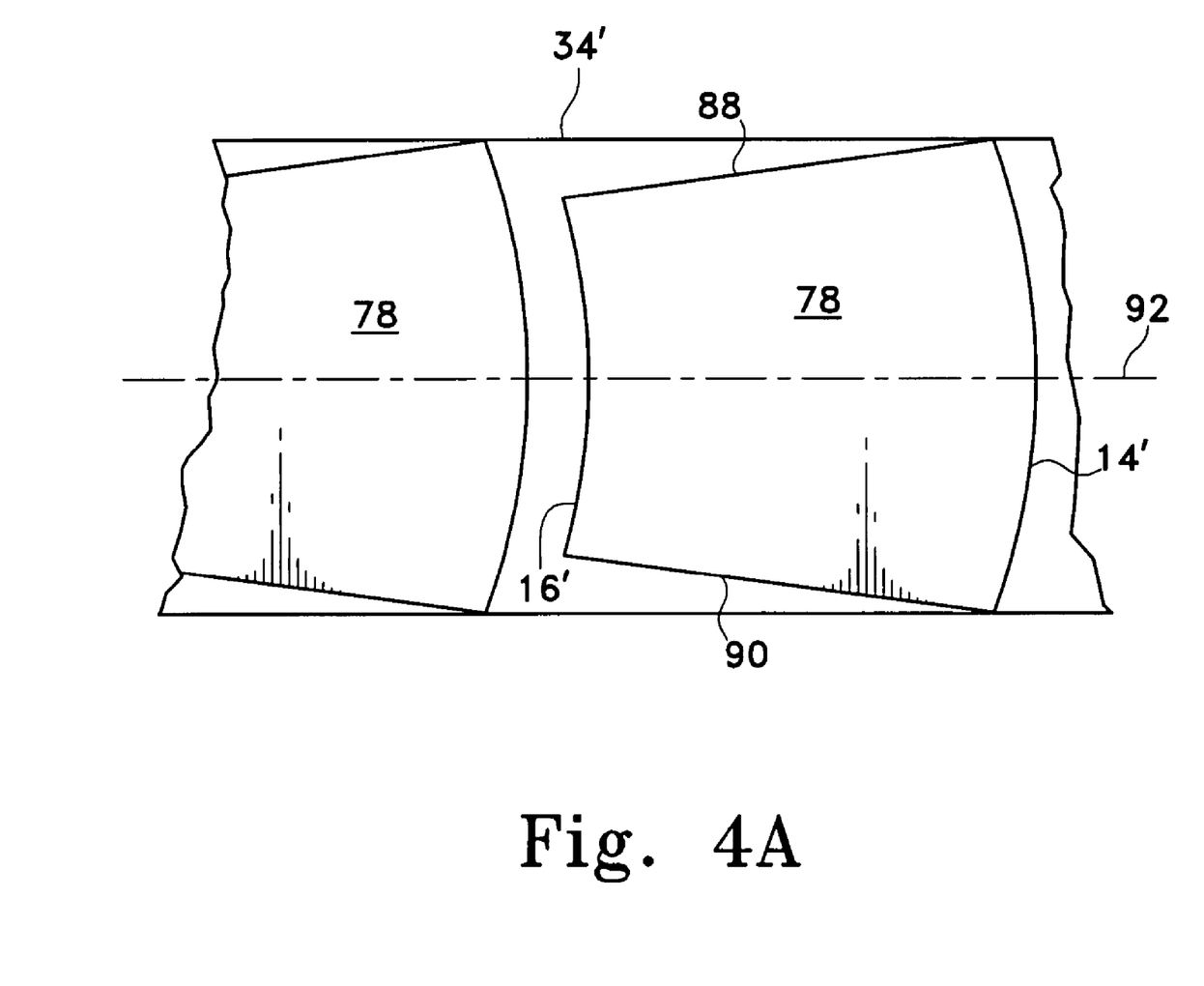
FIG. 4A shows an exemplary two-layer preform such as may be used in the machine of FIG. 4.
Figure 4B:
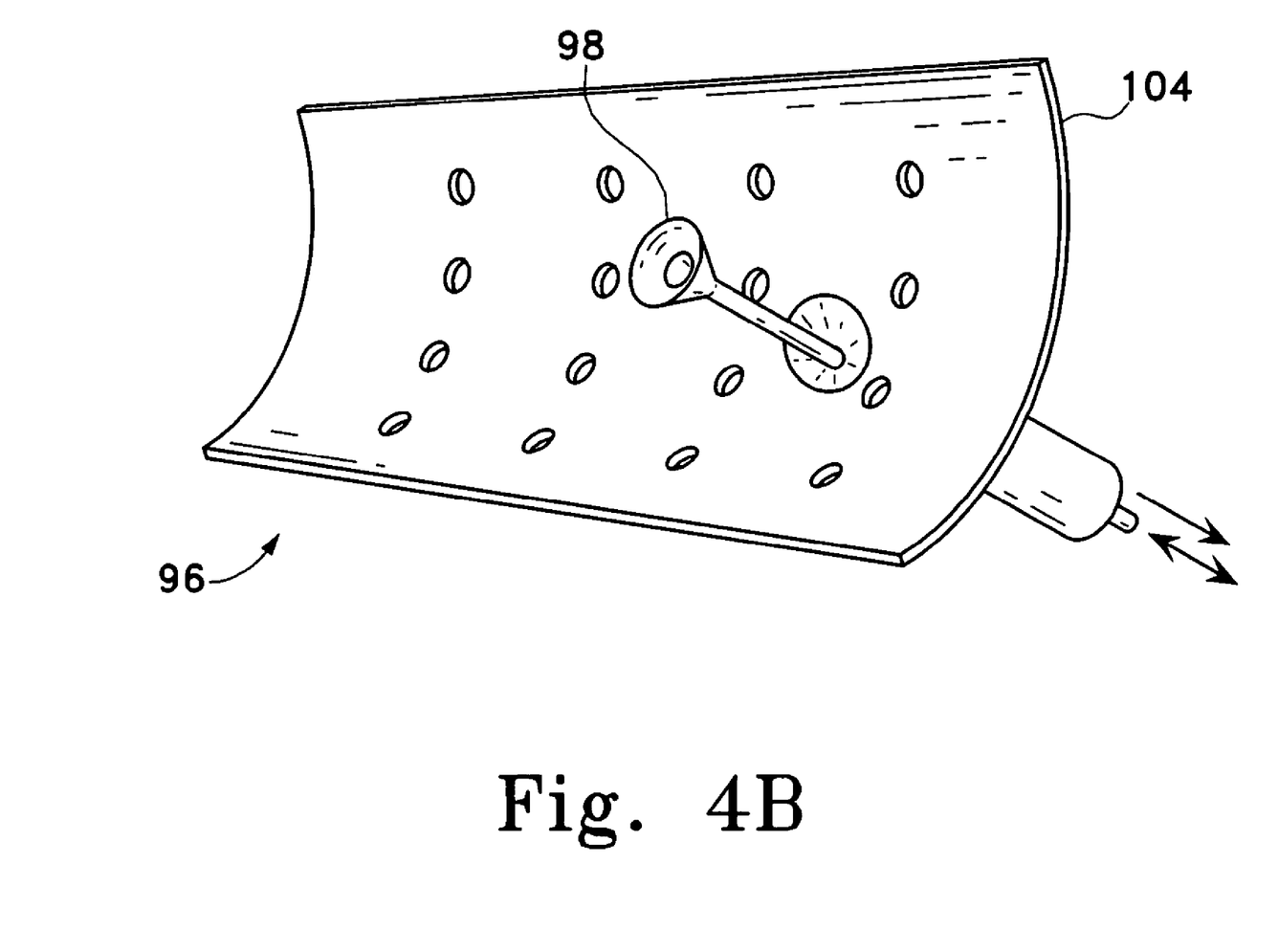
FIG. 4B is a more detailed view of an exemplary spreader such as may be used in the machine of FIG. 4.

FIG. 4 shows an alternative embodiment of a machine for forming a tapered inner liner 18' with two side seams 54 from a sleeve-like preform 78 (see also FIG. 4A) prior to securing it to the inner surface 20 of the rigid sidewall 22. Two stacked layers of shrink film 34' (either from two separate coils 80, 82, or from a single web that has been folded lengthwise, or from a flattened tube) are fed between a pair of opposing sealers 84, 86, which form two angled side seams 88, 90 of sleeve 78 at each side of centerline 92. A rotary cutter 94 then die cuts (or perforates) the upper edge 14' and lower edge 16', to thereby form a flattened sleeve 78, with each cut edge 14', 16' corresponding to one half of a corresponding upper edge 14 or lower edge 16 of the finished liner 18'. Any remaining trim is disposed of (possibly using vacuum to separate along seams 88, 90 and edges 14', 16'), and the preform sleeve 78 is opened by a vacuum operated spreader 96 (see also FIG. 4B) which is provided with an opposing pair of small reciprocating suction cups 98 for opening the flat sleeve so that the thus-opened sleeves 78 may be vacuum secured to the interior of spreader 96 and separated from the web 34'.

Figure 3A:
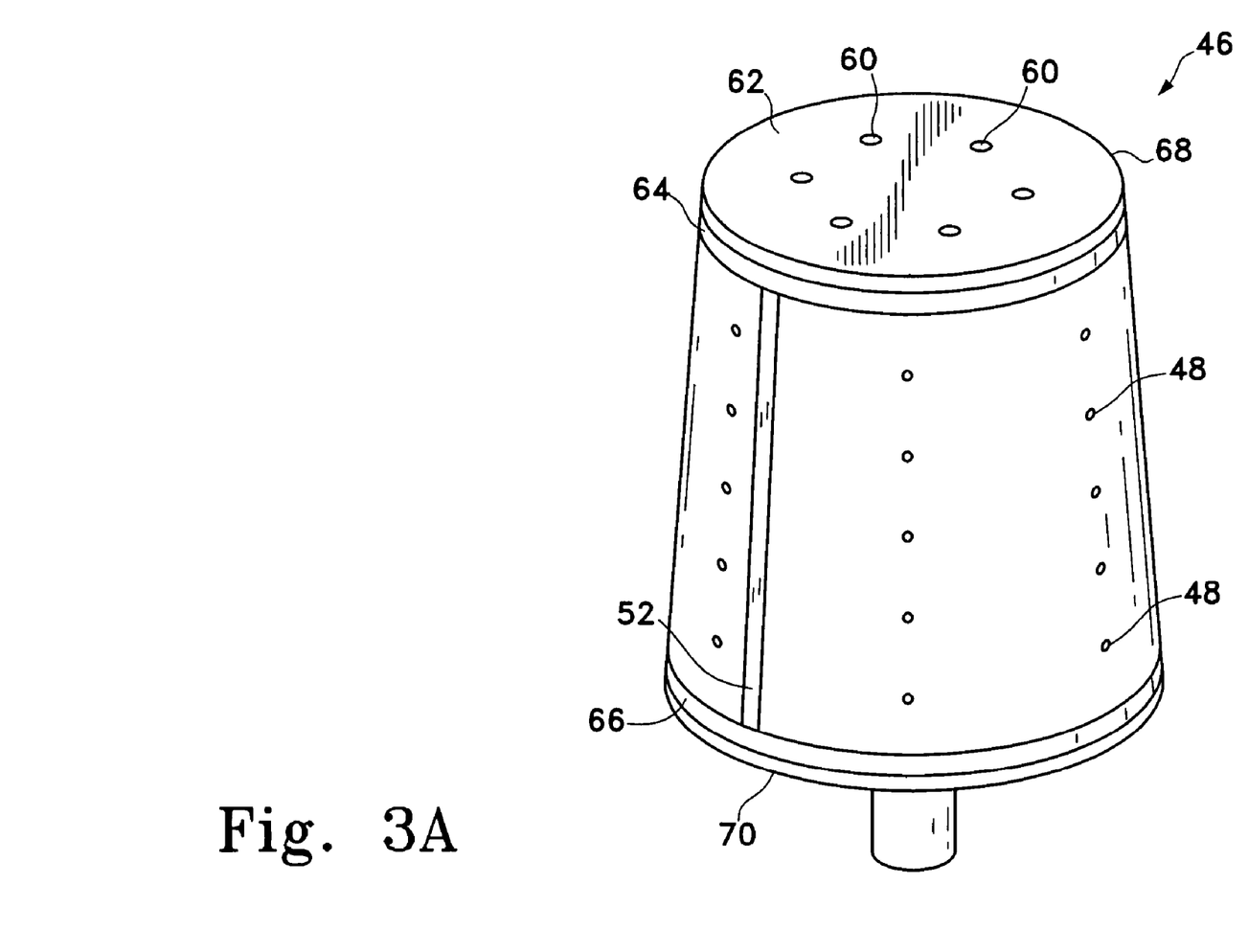
FIG. 3A shows an exemplary frusto-conical mandrel for use with the machine of FIG. 3.

When opened, sleeves 78 have a frusto-conical shape similar to that previously described with reference to liner 18 of FIG. 3 and can be loaded by spreader 96 directly onto a mandrel 46' that differs from mandrel 46 of FIG. 3A only in that it does not require a separate side seam heat band 52. In particular, a vacuum applied through holes 48 will serve to transfer the resulting frusto-conical liner 18' from spreader 96 onto mandrel 46'. As shown, mandrel 46' is mounted on a moveable support 100 and is moved along loading axis 102 into its position within spreader 96; alternatively, spreader 96 may be provided with a translation mechanism for moving the spreader 96 and the liner 18' along loading axis 102 onto position about mandrel 46'. The remaining steps of sealing the upper and lower circumferential bands 14, 16 at the respective upper and lower edge portions of liner 18' to the inner surface 20 of the not yet insulated cup 56 may be the same as described for FIG. 3 and will not be further described, other than to observe that since there is no side seam heat band 52, only a minimal amount of heat is applied by mandrel 46' to comfort band region 12 and it may not be necessary to take any special precautions for preventing the intermediate region 76 of liner 18' from adhering to the inner surface 20. In alternative embodiments (not shown), electrostatic forces could be used instead of vacuum to position and hold the relatively lightweight film of liner 18' to spreader 96 and/or mandrel 46'.

Figures 5, 5A, 5B, 5C, 5D:
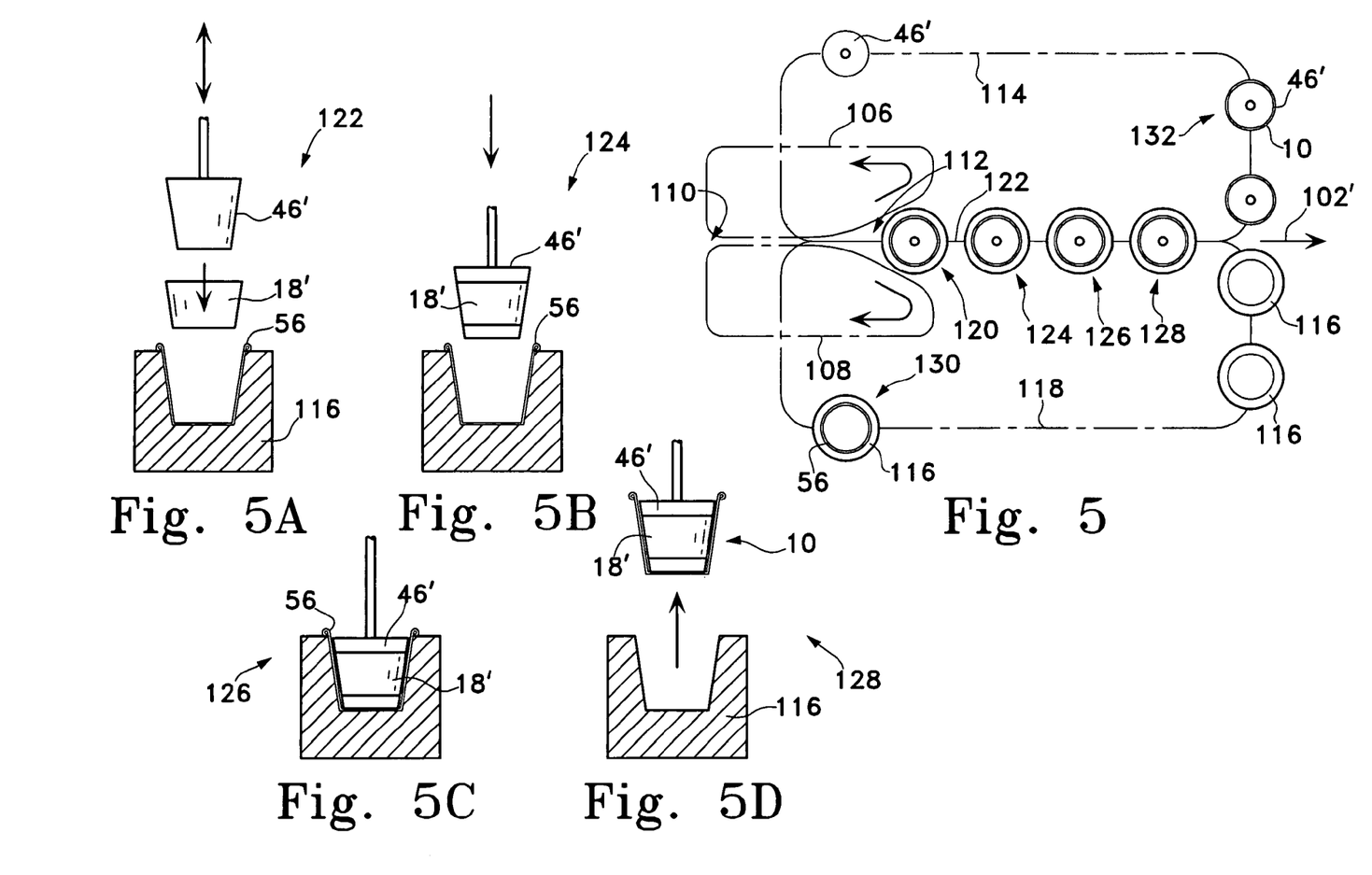
FIG. 5 shows an alternative embodiment of a machine for inserting and securing the inner liners into the respective outer sidewalls.
FIG. 5A shows a first step in the insertion process performed by the machine of FIG. 5.
FIG. 5B shows a second step in the insertion process performed by the machine of FIG. 5.
FIG. 5C shows a third step in the insertion process performed by the machine of FIG. 5.
FIG. 5D shows a fourth step in the insertion process performed by the machine of FIG. 5.

FIG. 5 shows an alternative embodiment of a machine for inserting and securing the inner liners 18' formed from preform sleeve 78 into the respective uninsulated cups 56. This particular embodiment is designed to provide a more continuous operation that may be more suitable for a low cost mass production environment. The flattened preform sleeves 78 are sealed and cut as previously in the heat sealer 84, 86 and rotary die cutter 94 stations along the production line, but with an orientation that differs from what has been previously described by 90°, i.e., the sleeve centerline axis is perpendicular rather than parallel to the motion 102' of sleeves along the production line. Rather than a single reciprocating spreader 96, there are a number of such spreaders 96, with the two spreader halves 104 of each spreader traveling in separate counter-rotating continuous motion paths 106, 108 on either side of the moving sleeves 78. As the two spreader halves 104 of the same spreader 96 advance in unison in the general direction of production line motion 102', each with its respective articulated suction cup 98 in contact with the moving sleeve 78, each cup 98 is gradually withdrawn into its respective spreader half 104 as the two halves move in unison from the beginning 110 of the narrow strait between the two spreader paths 106, 108 to a final open position 112 at the end of that strait, and then return along the far portion of their respective loop 106, 108 back to the beginning position 110. After it exits from the end 112 of the strait portion of the spreader paths 106, 108, the now opened inner liner 18' is transferred to a mandrel 46' traveling in the same direction but on a heat sealing loop 114, and above a corresponding cup receiver 116 traveling on a cup receiving loop 118.

All four closed paths 106, 108, 114, 118 are provided with translating conveyors (belts, chains, rails and the like) for keeping the relevant tooling in coordinated motion along the production path 102' as the liner 18' is placed over the mandrel 46', and then both the mandrel 46' and the liner 18' are placed inside a not yet insulated cup 56 that has previously been placed in the waiting cup receiver 116.

FIG. 5A shows schematically the opened liner 18' still attached to moving spreader halves 104 at first position 120 along sealing path 122 defined by the intersecting portions of heat sealing loop 114 and above cup receiving loop 118, with opened liner 18' suspended below a similarly moving mandrel 46' and cup receiver 116. FIG. 5B shows liner 18' at a second position 124 along sealing path 122, where it is no longer attached to the spreader halves 104, but is now secured to the mandrel 46'. FIG. 5C shows a third position 126 along sealing path 122 in which the liner 18' and mandrel 46' are now in position inside cup 56 which is still supported by cup receiver 116 as the upper edge 14 and lower edge 16 of inner liner 18' are being sealed to inner surface 20 of rigid sidewall 22 by the heat and pressure emanating from mandrel 46' and/or receiver 116. FIG. 5D shows a fourth position 128 at which the thus formed insulated cup 10 (still secured to mandrel 46') is being removed from cup receiver 116. The uninsulated cups 56 are loaded into the cup receivers 116 at entry point 130 on cup receiving loop 118 and the insulated cups 10 are removed at exit point 132.

Figure 6:
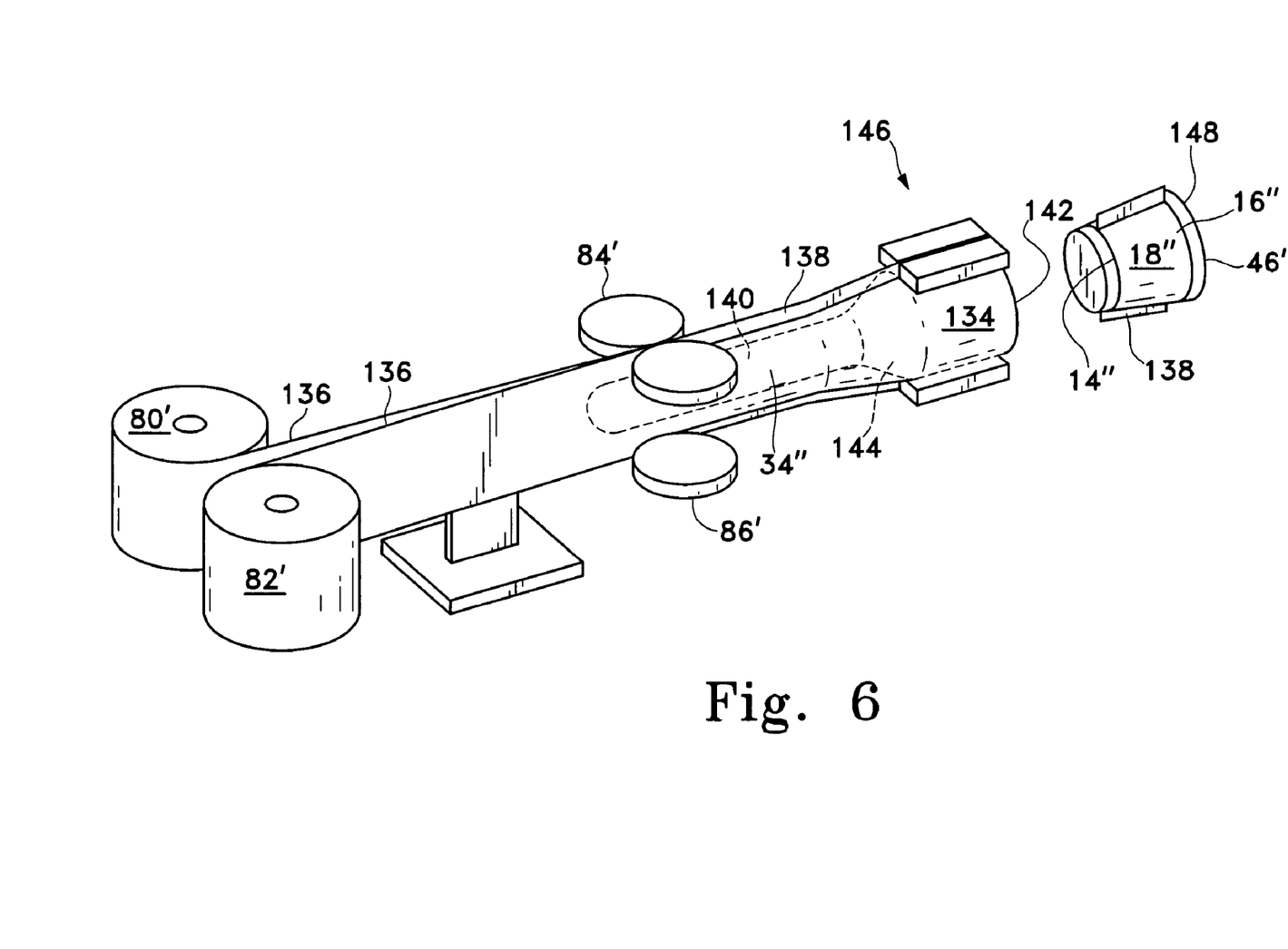
FIG. 6 shows an embodiment of a machine for forming a tubular preform for the inner liner which is stretched onto a tapered mandrel prior to insertion into the outer sidewall.

FIG. 6 depicts an exemplary machine for forming a tubular preform 134 for yet another variant of an inner liner 18" which can be stretched onto a desired shape prior to having its upper edge 14 and lower edge 16 sealed to the inner surface 20 of the rigid sidewall 22. As depicted, two rolls 80', 82' of a suitable plastic material are joined at their side edges 136 to form a tube 34" with lateral fins 138. Although the inner diameter 140 of the tube is substantially less than that of the maximum outer diameter 142 of the stretching mandrel 144, the fins 138 provide convenient attachment points for grippers 146 to pull the tube along stretching mandrel 144 and onto cup mandrel 46". Since the resultant liner 18" is thus pre-stretched prior to being edge sealed to the interior of cup 10, the central portion under comfort band 12 will tend to shrink into the interior of cup 10 even without the application of any heat, and thus this particular embodiment may find application even where the use of heat shrinkable materials is not practical. In an alternative embodiment, the tubular preform 134 initially has an inner diameter 140 greater than the maximum outer diameter 148 of the cup mandrel 46", and the heat shrink properties of the material are used to shrink and shape the preform to the external configuration of the mandrel 46" prior to inserting the mandrel 46" into the complementarily shaped rigid sidewall 22. In either case, the elongated tube stock 34" is sectioned into individual preforms 134 as it is being placed on cup mandrel 46" possibly using already existing perforations (not shown) in the tube stock.

Other implementations and enhancements to the disclosed exemplary apparatus and processes will doubtless be apparent to those skilled in the art, both today and in the future. For example, the invention may be applicable to containers other than disposable cups for hot beverages and/or to containers having a shape more complex than a simple orthogonal circular cone. As another example, the interior of an uninsulated cup made of other materials and/or by other processes not expressly mentioned above may be covered in whole or in part with a flexible lining that forms an insulated comfort band defined by a circumferential void between the outer wall and the lining.

The invention claimed is:

1. A sidewall surrounding the interior of a container, said sidewall comprising:
a rigid outer wall, and
a flexible inner liner,
wherein
the outer wall and the inner liner are attached together at respective upper and lower circumferential bands of the liner, and at least an intermediate portion of said liner between the upper and lower circumferential bands is separable from the outer wall to thereby form a sealed void defining a comfort band encircling said container between said upper and lower circumferential bands, and
said sealed void is defined at least in part by an outer surface of the inner liner and an inner surface of the outer wall.

2. The sidewall of claim 1 wherein the inner liner is formed from a heat shrinkable plastic material and, in response to the application of heat to said inner liner, said outer surface is spaced apart from said inner surface along an entirety of an intermediate circumference between said upper and lower circumferential bands.

3. The sidewall of claim 2 wherein said sidewall forms a cup for a heated beverage, and heat from the beverage causes the liner to shrink away from the outer wall.

4. The sidewall of claim 1 wherein the inner surface of the outer wall is coated with a plastic material.

5. The sidewall of claim 4 wherein the plastic material is a polyethylene plastic material.

6. The sidewall of claim 1 wherein the inner liner is formed of a biaxially oriented heat shrinkable plastic material.

7. The sidewall of claim 6 wherein the container is a stackable disposable cup and the liner is activated only after the cup is filled with a hot liquid, whereby the liner remains in close contact with the outer sidewall prior to use by the consumer and two or more unused cups may be conveniently stacked inside one another without the liner of a lower cup pressing against the outer sidewall of an upper cup.

8. The sidewall of claim 1 wherein
the inner surface of the outer wall is coated with a polyethylene plastic material,
the inner liner is formed of a heat shrinkable plastic material, and
a sealed insulating airspace is formed by heat sealing the heat shrinkable plastic material to the polyethylene plastic coating.

9. A stackable insulated cup for holding a hot beverage, said cup having a generally frusto-conical shape and comprising:
a tapered sidewall portion including a rigid outer wall and a flexible inner lining wherein the inner lining is attached to the outer wall at respective upper and lower circumferential bands of the inner lining, to thereby form a sealed void between said outer wall and said lining; and
a circular bottom portion attached to the tapered sidewall, wherein
said sealed void is defined by an outer surface of the flexible inner lining and an inner surface of the rigid outer wall,
said outer surface is separable from said inner surface along an entirety of an intermediate circumference between said upper and lower circumferential bands,
the inner surface of the outer wall is coated with a polyethylene plastic material,
the inner wall is formed of a heat shrinkable plastic material, and
the sealed void is formed by heat sealing the heat shrinkable plastic material to the polyethylene plastic coating.

10. The stackable insulated cup of claim 9 wherein the heat shrinkable plastic material is activated only after the cup is filled with a hot liquid, whereby the liner remains in close contact with the outer sidewall prior to consumer use and two or more unused cups may be stacked inside one another without the liner of a lower cup pressing against the outer sidewall of an upper cup.

11. The stackable insulated cup of claim 9 wherein
said rigid outer wall has a generally frusto-conical shape with an overlapping side seam,
the overlapping side seam extends from below the bottom circumferential band to above the top circumferential band, and
the outer surface of the inner wall is separable from at least a portion of said side seam in the vicinity of said intermediate circumference.

12. The stackable insulated cup of claim 9 wherein said rigid outer wall is made of disposable paperboard.

* * * * *